United States Patent [19]

Levy

[11] Patent Number: 5,096,721
[45] Date of Patent: Mar. 17, 1992

[54] PROCESS FOR MAKING AN AQUEOUS BEVERAGE AND REMOVING CHLORINE THEREFROM

[76] Inventor: Ehud Levy, 1033 Chestnut Hill Cir., Marietta, Ga. 30064

[21] Appl. No.: 606,307

[22] Filed: Oct. 31, 1990

[51] Int. Cl.$^5$ ............ A23L 2/00; C02F 1/70; A23F 5/26; A23F 3/18
[52] U.S. Cl. .................. 426/66; 210/757; 210/508; 426/433; 426/435; 426/590
[58] Field of Search ............ 426/66, 78, 433, 435, 426/594, 595, 597, 590; 210/757, 758, 754, 756, 506, 507, 508, 509, 501, 902, 915, 282

[56] References Cited

U.S. PATENT DOCUMENTS

| | | |
|---|---|---|
| 2,531,594 | 11/1950 | Abrahams . |
| 2,671,026 | 3/1954 | Hirschhorn . |
| 2,801,736 | 8/1957 | Grow . |
| 3,026,208 | 3/1962 | Gyorgyi .................. 426/66 |
| 3,174,889 | 3/1965 | Anderson et al. . |
| 3,202,275 | 8/1965 | Loughary . |
| 3,252,803 | 5/1966 | Belasco . |
| 3,260,674 | 7/1966 | Ross . |
| 3,386,834 | 6/1968 | Noiset . |
| 3,526,316 | 9/1970 | Kalogris . |
| 3,556,803 | 1/1971 | Ehrreich, III et al. . |
| 3,702,820 | 11/1972 | Hough . |
| 3,889,000 | 6/1975 | Cante et al. . |
| 3,915,296 | 10/1975 | Spencer . |
| 3,971,852 | 7/1976 | Brenner et al. . |
| 4,295,985 | 10/1981 | Petrow et al. . |
| 4,312,889 | 1/1982 | Melsheimer . |
| 4,364,835 | 12/1982 | Cheh ...................... 210/757 |
| 4,666,610 | 5/1987 | Kuhns ..................... 210/754 |
| 4,816,177 | 3/1989 | Nelson et al. . |
| 4,908,215 | 3/1990 | Perlman . |
| 4,937,004 | 6/1990 | Mandrin et al. . |

FOREIGN PATENT DOCUMENTS

| | | | |
|---|---|---|---|
| 766309 | 10/1971 | Belgium ................... | 426/78 |
| 485722 | 5/1938 | United Kingdom ........ | 426/66 |
| 2074532 | 11/1981 | United Kingdom ........ | 426/78 |
| 2094992 | 9/1982 | United Kingdom . | |

OTHER PUBLICATIONS

Betz Handbook of Industrial Water Conditioning 7th Ed. 1976, pp. 24-29.
Manufacture & Analysis of Carbonated Beverages Chem. Publ. Co., 1959, Jacobs pp. 89-109.
Coffee Technology, AVI Publ., Sivetz et al, 1979, pp. 680-684.
Research Disclosure, 11/79, 4/26/66, p. 630.

*Primary Examiner*—Steven Weinstein
*Attorney, Agent, or Firm*—Penrose Lucas Albright

[57] ABSTRACT

Thiosulfate in anhydrous form is added in minute amounts to beverages or food mixes, wherein tap water is added in quantities not greater than about one quart, to neutralize or destroy chlorines or chloramines in the water, such neutralization or destruction taking place almost instantaneously and, in any event, in a length of time not greater than about twenty seconds, depending upon the pH of the beverage or food. The thiosulfate may be added directly to the beverage or to the water or may be mixed with syrup or powder mix, and may be encapsulated with a food grade material which is readily dissolvable in water. Because of the rapid reaction of the thiosulfate with the chlorines and chloramines, the neutralization or destruction of same is essentially complete before a person commences to consume the food or beverage. The thiosulfate may be applied to articles which are inserted into the beverage or the food, or which receive same such as cups, stirrers, straws and the like.

4 Claims, No Drawings

PROCESS FOR MAKING AN AQUEOUS BEVERAGE AND REMOVING CHLORINE THEREFROM

FIELD OF THE INVENTION

This invention relates to a method and materials for removing chlorine and chloramines from chlorinated water as or before it is mixed with other substances to constitute a beverage or food, whereby the dechlorination is completed before the beverage or food is consumed. More particularly, it relates to the destruction of the products of hypochlorite used to disinfect tap water, when that water is added to other substances to produce beverages or food, by the rapid autocatalytic reaction of thiosulfate with such products, this reaction occurs very quickly, at least within seconds, upon mixing the thiosulfate with water from municipal water sources at the time the water is with substances such as powdered tea, soft drinks, syrups, soups and other food mixes, to produce a beverage or food, whereby the dechlorination is complete before consumption of the beverage or food is commenced.

BACKGROUND OF THE INVENTION

Chlorine is often present in water from municipal sources as a result of disinfection processes. Chlorine (including chloramine) levels in municipal water supplies range up to about 3 ppm. These chlorines and chloramines, together with other substances which may be dissolved or present in municipal water supplies, affect its taste. They also control the water's pH at point of use which, when supplied from municipal water sources, is usually within a range of 6 to 9 pH and under EPA standards should generally be within a range of 6.5 to 8.5 pH.

Activated carbon filters at point of use comprise a well known means for removing chlorine from water. However, there are significant expenses incident to modification of plumbing, as well as the provision for and replacement of the filters. Moreover, a pressure drop occurs across the filters and their effectiveness for the removal of chlorines and chloramines is not always dependable.

It is also known that salts of the sulphur oxide family can be useful dehalogenation agents. Such agents include iron sulfate and thiosulfates such as sodium thiosulfate.

When adding sulfur oxides such as, for example, sodium sulfite and thiosulfates, to water, it is considered important to keep their proportions rather closely to those required for the reaction with the chlorine and chloramines therein, because greater proportions can cause a reducing effect which, although not injurious to health, is undesirable, and lesser amounts are not effective. When a thiosulfate is used to destroy the chlorine and chloramines resulting from hypochlorite disinfectants added to the water, these undesired substances are destroyed by an autocatalytic reaction with the thiosulfate at a molar ratio of about 0.25 moles of thiosulfate to 1 mole of hypochlorite.

Sulfite reaction times with chlorines and chloramines in tap water are reported to require minutes and sometimes hours or even days, and to be substantially dependent upon the temperature of the solutions, their pH values, and the particle sizes of the sulfites.

Sodium thiosulfate, which is the most readily available of the thiosulfates, is also known to have a cooling taste with a bitter aftertaste. It is, however, generally considered harmless and, for some purposes, beneficial in doses of a gram or less, and the same is true for calcium thiosulfate and magnesium thiosulfate.

SUMMARY OF THE INVENTION

I have discovered unexpectedly that the neutralization or destruction of chloramines and chlorines when thiosulfates are added to limited quantities of tap water (up to 24 ounces) in the very minute amounts (1.5 milligrams or less per quart of water) as required by stoichiometric proportions, occurs very rapidly within a matter of seconds at most, and usually in less than one second, and often too quickly for accurate time measurements. The length of time for the reaction depends largely on the pH value of the water after being mixed or infused with the food or beverage material. Also, I have discovered that the dependence on the temperature for the specific applications is considerably less than anticipated and for almost all practicable purposes is nonexistent. For example, with soft drinks wherein the pH is generally in a range of 2.5 to 3.5, the destruction time is less than 0.5 seconds, and there is very little variation in this period of time irrespective of whether the liquid that is added at a high temperature, nearly 100° C., or at a low temperature, nearly 0° C. The amount of sodium thiosulfate which is added is quite minimal being, for 8 ounces, about 0.125 milligrams. A preferred application of the thiosulfate is to the interior of a disposable container, such as a paper cup. Sodium thiosulfate used in accordance with the invention should preferably be a U.S.P. or food grade material of 99.5% purity or better. The amount of thiosulfate required to destroy chlorines and chloramines in most tap waters is so minimal that there is no adverse or even noticeable taste imparted to the beverage or food to which the water and thiosulfate have been added. To the contrary, the thiosulfate reaction reduces the pH of the water and the resulting beverage or food, with few exceptions, tends to have its taste and flavor improved. This improvement is in addition to the removal of chloramines and chlorines which, per se, adversely affect the taste and flavor of the beverage or food. In those few cases wherein a decrease in the pH of the resulting beverage or food may adversely affect its flavor or taste, a buffer can be added to retard the reduction of the pH value.

The thiosulfate can be added not only to containers, but also to other articles which come into contact with the water, such as tea bags and paper filters or disks for use in pitchers and carafes. Webs used for tea bags are generally soft, tissue-thin fibrous materials characterized by lightweight and freedom from rupture in boiling water. The fibers can be any of a well known number of paper making fibers or mixtures thereof, for example, natural fibers such as manila hemp, caroa, jute, bleached or unbleached kraft, sisal and kozu or synthetic fibers, such as viscose and acetate, rayon, polyamides, vinyl acetate-vinyl chloride copolymers, wherein the addition of the small amounts of thiosulfates can be incorporated in the webs, per se, or mixed with the packaged tea. In either case, the diffusion is almost immediate although tea bags should left for two to three minutes in boiling hot water for best results.

Coating or impregnating coffee paper filters with thiosulfate for removal of undesirable taste, chemicals and the like, improves the coffee. But for some tastes, it may lower the pH more than desired. In such cases, a buffer to retain the pH at the desired value should also be added.

Thiosulfate in accordance with the invention can also be mixed directly with solid food material, syrups, powders or mixes of sugar, or other items which come into contact with water. This includes non-foods such as liquid and powdered soaps. It can also be used to eliminate chlorine and chloramines in drinking water, as such, at point of use. It can be mixed with artificial sweeteners, in powder form or liquid, which may be added to tea, coffee and other drinks such as cocoa to eliminate the taste of chloramines and chlorines.

As indicated above, ordinary city water generally contains up to about 3 ppm of chlorine, whereby the amounts of thiosulfate required to eliminate the chlorine from the water is quite small. It eliminates not only the taste of chlorine, but also the odor of same, and generally improves the taste of the product. Tests have shown that traces of salts and sulfates at less than 0.5 mg per liter to less than 0.05 mg per liter remain in the water so treated. This is, below by an order of magnitude, the E.P.A. standard minimum of 250 mg per liter or the FDA maximum of 0.1% in food products.

The invention is applicable to almost any situation wherein tap water which has been disinfected by chlorine or chlorine containing compounds is used.

When the pH in the water is less than 6, the chlorine is converted to hypochlorous acid (HOCl). When the pH is greater than 9, the chlorine reacts with the water to form $OCl^{-e}$, which reacts and destroys ammonia which tends to cause the taste of teas, coffees and other natural flavors to be flat.

Possible chlorine related couples which may occur in aqueous solutions include the following:

TABLE I $2Cl^- = Cl_2 + 2e^-$
$Cl^- + 2OH^- = ClO^- + H_2O + 2e^-$
$1/2Cl_2 + H_2O = HClO + H^+ + e^-$
$Cl^- + H_2O = HClO = H^+ + 2e^-$
$HClO + H_2O = HClO_2 + 2H^+ + 2e^-$
$ClO^- + 2OH^- = ClO_2^- + H_2O + 2e^-$
$HClO_2 = ClO_2 + H^+ + e^-$
$ClO_2 = ClO_2 + e^-$
$ClO_2 + H_2O = ClO_3 + 2H^+ + e^-$
$ClO_2 + 2OH^- = ClO_3^- + H_2O + e^-$

An important object of the invention is to convert undesirable chemical species to those which are neither harmful nor otherwise objectionable. To the extent that city water is involved, this occurs with the destruction of the chlorine and chloramines that were added to the water, usually as hypochlorite, for disinfection purposes. Inasmuch as HOCl constitutes a weak acid, it should be appreciated that the pH value plays a most important role in the thermodynamics of thiosulfate oxidation reactions. Where the pH is in excess of 9, a small amount of sodium borate ($Na_2B_4O_7 \cdot 10H_2O$) may be used to reduce and control the reduction of the pH level.

When tea bags, filters, cups and the like are stored and sold in hermetically sealed containers, the amount of thiosulfate desired can be sprayed onto or into each container as appropriate, either directly or mixed with water or with a mixture of gelatin and water. Although in substantially greater amounts, various methods for applying provided materials to containers are disclosed in U.S. Pat. No. 4,312,889, of Melchelmer. In addition, for long term storage, thiosulfate particles, which preferably have a maximum particle size of about 75 microns, can be encapsulated in a water soluble matrix of materials such as taught by U.S. Pat. No. 3,971,852, of Brenner et al.

Factors to be considered in how the thiosulfates are applied and whether or not they should be encapsulated or pH buffers should also be used with them, including the type of packaging for the product, that is whether or not hermetically sealed, the expected shelf life of the product, and whether the product includes any substances with which the thiosulfates may react which may preempt or substantially preclude their desired reaction with the chlorines and chloramines. Also, the specific thiosulfate used or mixture thereof may require some experimentation to determine the optimum of thiosulfate or mixture. But, as stated above, because of its ready availability, sodium thiosulfate is the preferred thiosulfate. Otherwise only the magnesium and calcium thiosulfates are recommended for use in the invention for beverages or foods, although potassium thiosulfate should not be overlooked as a possible substitute.

When a thiosulfate is to be bonded or encapsulated, it is important that this be accomplished by a food grade material mixed with the thiosulfate.

The thiosulfate can be added to products which subsequently are mixed with water containing chlorines and chloramines, such as frozen liquid concentrates for beverages, e.g., orange juice or lemonade, in syrups for soft drinks such as Coca-Cola and Pepsi-Cola, with mixtures such as freeze dried tea and freeze dried or instant coffees, and with mixtures intended for alcoholic drinks wherein water is also added. It also can be premixed with sweeteners including artificial sweeteners, whereby the resulting product both sweetens and removes chemicals such as chlorines and chloramines simultaneously.

It has also been found that the thiosulfate can be premixed with baking products as well as other food products, which prescribe the use of added water such as cake mixes, pizza mixes, soups and soup mixes, flour, yeast and the like. It has been found that bakery products which use tap water for mixing with the flour or other mix, upon being baked, rise about 5-10% higher than without the addition of thiosulfate.

Thiosulfates can also be added to drinks, in much the same manner as small grains or pellets of sweeteners are added, including water, as such, and to premixtures for drinks which may or may not include liquids.

Thiosulfates can further be added to dispensing machines, wherein cups are automatically filled with a syrup and a carbonated water by being added to the water or to the syrup, or being preaffixed to the interior of the paper cup for receiving the beverage. It can also be added by a separate dispenser in a drop of water or as a small pellet. It can be incorporated into yeast, dried or in cake form, wherein the yeast is used for baking products to which tap water is added in order to make the performance of the yeast more uniform, as well as to improve it and the quality of the baked product.

Although the primary object of this invention is directed to the addition of thiosulfate in small amounts to relatively small quantities of water, generally one quart and preferably twenty-four ounces or less, it can also be added to bottled water or larger volumes of water, wherein there is no need for the destruction of the chlorines and chloramines to occur almost immediately or at least within a matter of a few seconds.

DESCRIPTION OF THE PREFERRED EMBODIMENTS

An important aspect of the present invention involves the discovery that thiosulfates can be added to a relatively small volume of water such as a liter or less, which contains chlorines and chloramines within the limits generally prescribed for water from municipal water sources, whereby the chlorines and chloramines are destroyed almost immediately without adversely affecting the taste of the water. The thiosulfate in combining with the chlorines and chloramines and other substances in the water, does not add more than very minimally to the salts and other materials usually present in tap water. The tastes of beverages or foods made by the mixing of water therewith are improved to the extent that the chlorines and chloramines have been removed and also, with most foods and beverages, because the pH level of the mixture has been reduced. The discovery also encompasses the circumstance that the time lapse required to destroy the chlorines and chloramines is primarily sensitive to the pH of the water and substantially insensitive to its temperature. With a pH as low as 2.5, the chlorine and chloramines are destroyed essentially instantly. With a neutral pH of 7, the destruction time is approximately three seconds. When the pH is as high as 8, which is very rare for the application involved, the approximate destruction time is ten seconds and with a pH of 9, it is double that, or about twenty seconds. Finally, when the pH is as high as 10, a sixty second lapse can be expected. If it is anticipated that the pH of the water will be above 9, and the substance to be mixed with the water will not lower its pH, which is extremely unlikely not to occur, then a buffer solution may also be added to accelerate the process with the buffer solution acting to reduce the pH value to approximately 7. Thus, it will be appreciated that with a limited amount of water only (about one liter or less) when the pH value is approximately 10 or higher, the time period required for the destruction of the chlorines and chloramines in the water may be greater than one minute. But with tap water added to form a beverage or food in accordance with the invention, such a long time lapse is yet to be experienced. With thiosulfates, when the pH is at lower levels, the reaction is accelerated and becomes autocatalytic.

In an aqueous solution, a chlorine is hydrolyzed to produce an equilibrium ions of chlorine and hypochlorous acid. The equilibrium is such that if the pH has a value of about or somewhat greater than 3, and the chlorine is about 3 ppm, there is little or no molecular chlorine present. As the pH approaches but is under 6, whatever chlorine is in the water is readily converted to hypochlorous acid. With the pH of the water greater than 9, the chlorine reacts with water to form the negative ion $OCl^{-e}$, a species which is reactive with ammonia. Accordingly, it will be appreciated that the pH value determines the distribution of chlorine between the two species, the negative ion $OCl^{-e}$ and $HOCl$.

In water treatment plants, oxidation is used to convert undesirable chemical species to those which are neither harmful nor otherwise objectionable. However, as a practical matter, it is not possible totally to eliminate all undesired constituents from the water. Thus, chemical oxidation processes are employed primarily to reduce the concentration of inorganic chemicals containing manganese, iron, sulfides, cyanamides and sulfites, and organic substances such as phenols, amines, humic acids, and other taste, odor or color producing substances as well as toxic chemicals, bacteria and algae. The most frequently used oxidizing agents based on cost, effectiveness, ease of handling, history, and considering subsequent treatment steps, as well as the specific type of oxidation involved, are oxygen or air, ozone, hydrogen peroxide, potassium permanganate, chlorine or hypochlorites and chlorine dioxide. Depending upon the chemicals present in the water, all types of oxidation-reduction reactions may occur.

Those who direct water treatment should have a precise knowledge of the reactions, products, and conditions present. Nevertheless, a trial and error approach is often necessary. For example, water may be treated at a municipal treatment plant by the addition of lime to raise the pH and thus, cause the precipitation of calcium and magnesium with alum being added simultaneously to facilitate sedimentation. Then carbon dioxide may be added to lower the pH and powdered activated carbon added to control taste and odor. A chlorination process is often included wherein chlorine is added to raise the parts per million of the water to approximately 8 ppm with a contact time of, say, six hours. A thiosulfate may be added to eliminate residual chlorine at a stoichiometric ratio of sulfite to chlorine in amounts about three times that necessary. Remaining chlorine then may be converted to a monochloramine by the addition of ammonia at a two fold excess over the residual chlorine. This also largely suppresses mutagen production. The water is then filtered and again chlorine may be added in the form of hypochlorite to bring the chlorine content to about 3 parts per million. A typical pH may range from 7.5 to 8.5 or somewhat higher.

Because of this treatment and also to some degree, in spite of it, water received at point of use in the home or otherwise usually has about 1 to 3 parts per million chlorine content and other substances dissolved in the water such as lime, various metals, amines, humic acids and certain levels of bacteria, algae and sulfites. The specific content of these substances varies from place to place depending upon the source of the water and the treatment accorded to the water.

Because of the variations in water sources and treatments, the various mixtures of tap water with substances to provide beverages or other foods may result in different tastes from area to area. To complicate this, populations of different areas tend to become accustomed to their water, whereby when travelling they may find beverages and foods taste quite differently from what they remember from home, as well as different from what the local inhabitants seem to experience.

Although chlorine and chloramines as well as other impurities in water can be removed, or at least substantially reduced by various filtration processes at point of use, these processes require a certain amount of time for contact with the water, space, capital costs and inconveniences incident to maintenance and replacements, as well as reducing the effective water pressure at the faucet.

I have discovered that essentially the same advantages of filtration, if not greater advantages, can be obtained through the removal of chlorines and chloramines by the addition of sulfite salts and particularly, by the addition of thiosulfates to the water immediately prior to or during preparation of the foods or foodstuffs. I have used for this purpose, primarily and preferably, sodium thiosulfate. But calcium thiosulfate and magnesium thiosulfate may also be used and, under certain conditions, potassium thiosulfate may be employed. In each case the anhydrous thiosulfate is preferred. These thiosulfates may be applied individually or in combination. Preferably the thiosulfate should be at least 99½% pure.

The thiosulfate may be bonded directly or by the use of food grade bonding material, to paper and other disposable cups and drinking containers. A sixteen ounce container requires not more than 1.5 milligrams per liter of thiosulfate bonded to the interior of the cup. The temperature at which the tap water is added to the container, it has been found, has very little effect on the rapidity of the reaction of the thiosulfate with the chlorines and chloramines in the water. The length of time required for reaction is determined almost entirely by the pH of the mixture and, as a practical material, is essentially immediate. Inasmuch as the water is usually being added to a powder or syrup mix, or being added simultaneously therewith, and because most beverages have a pH value of less than 7, the destruction of the chlorines and chloramines in the beverage occurs in less than three seconds. There also is a significant reduction or destruction of organic substances such as amines, humic acids, bacteria, algae and metals ions dissolved in the water. The beverage tastes, such as the taste of tea, are substantially improved compared to the same beverages without the thiosulfate having been added. Although sodium thiosulfate is known to provide a cooling taste with a bitter aftertaste, the amount added is so minute that the taste of thiosulfate is not detectable.

Most beverages have relatively low pH values. Accordingly, thiosulfate can be added by a dispensing machine for a soft drink either diluted in water, applied to the container as described above or mixed in the soft drink syrup or powder. Because the reaction time is less than three seconds, and usually is essentially immediate, by the time the person using the dispensing machine commences to drink the beverage, the reaction is substantially complete whereby the individual appreciates the improved taste due to the elimination of chlorines and chloramines from the beverage.

If the thiosulfate is added to a hot beverage such as coffee, it can be mixed with the coffee material, per se, applied to the container for receiving the coffee in either dry or liquid form or applied to a filter.

The amount of thiosulfate which is to be added to the water can, if desired, be customized to the water of the local area. Thus, for example, wherein the chlorine levels are less than the usual maximum of 2.5 or 3 ppm, lesser amounts of thiosulfate may be used. However, even if more thiosulfate is used than required to neutralize or destroy the chlorine is added, which is 0.25 to 1 on a molecular basis to the stoichiometric amount of chlorine and chloramines present in the water, the thiosulfate is harmless in any event, being well below the maximums prescribed by the FDA and EPA.

The thiosulfate can be dispensed in pellets, liquid drops or bonded to the container or other material which contains or will contain the mix or the beverage, or both. It also may be encapsulated in substances which are harmless, as such, to humans and which dissolve readily in water. This is important when a long shelf life is desired or when adding the thiosulfate directly to the mix to prevent unwanted reactions between the thiosulfate, per se, and the substances of the mix before use. Many items such as the cups in a dispensing machine need not have a long shelf life and any requirement to protect by encapsulation or covering the thiosulfate bonded in such cups is not, in most areas, a problem if normal packaging procedures are followed. On the other hand, wherein long shelf life is desired, it is important that the encapsulation or covering substances not only be readily dissolvable in water but also capable of being so dissolved in a manner of a second or so, to permit rapid dispersion and diffusion of the thiosulfate into the surrounding liquid.

In addition to applying thiosulfates to containers, powdered mixes and syrups or concentrates, it also can be applied to articles which are used to stir or otherwise are placed in liquids wherein the thiosulfate reaction with the chlorine and chloramines is desired. Examples are plastic or wooden spoons used for stirring, stirrers, as such, and straws which are inserted into liquids. With straws, minor amounts of thiosulfate may be applied both to their inner and outer surfaces or to either. A process for applying thiosulfate to such articles will be understood by reference to U.S. Pat. No. 3,252,803, of Belasco which, although it does not relate directly to thiosulfates, discloses how edible solvents can be adhesively applied to spoons and spatulas as well as cups.

Treatment of tap water in accordance with the invention results in a small amount of added salt, NaCl and sodium sulfates where sodium thiosulfate is used or corresponding salts with the other thiosulfates. However, the additional salts are so minimal as to be insignificant for those who avoid salt for dietary reasons.

Although I have described the preferred embodiments of my invention, it is understood that it is capable of other adaptations and modifications within the scope of the appended claims.

Having disclosed my invention, what I claim is new and to be secured by Letters Patent of the United States is:

1. A process for making an aqueous beverage comprising a mixture of water and flavor substance, and removing chlorine from said beverage when said water and said flavor substance are mixed together to form said beverage, said method comprising mixing said water in a quantity not more than about one liter with said flavor substance which imparts flavor to said water to form said beverage, said flavor substance selected from the group consisting of coffee, tea, and soft drink syrup; adding to said water substantially simultaneously with said step of mixing said water with said flavor substance, an alkali metal or alkaline earth metal thiosulfate selected from the group consisting of sodium thiosulfate, magnesium thiosulfate and calcium thiosulfate; said water, at the time of said mixing, and before said addition of said alkali metal or alkaline earth metal thiosulfate, having a pH of between about six and nine and a chlorine content of about 1-3 ppm; said alkali metal or said alkaline earth metal thiosulfate being added to said water in an amount sufficient to react with said chlorine in said water which is on a 0.25-1.00 to one molecular basis with the stoichiometric amount of said chlorine present in said water, said reaction being substantially complete in a period of time which is less than about twenty seconds, and does not delay the intended consumption of the beverage.

2. A process in accordance with claim 1, comprising a further step of applying said alkali metal or alkaline earth metal thiosulfate to a coffee filter which adds such applied thiosulfate to said water substantially simultaneously with the step of mixing said water with said flavor substance, said flavor substance comprising coffee plated in said filter, while said coffee and said water are in and passing through said filter.

3. A process in accordance with claim 1, wherein the adding of said alkali metal or alkaline earth metal thiosulfate comprises first introducing said alkali metal or alkaline earth metal thiosulfate to water within a soft drink dispensing machine and then substantially simultaneously with such introduction, mixing said water to which said alkali metal or alkaline earth metal thiosulfate has been introduced with said soft drink syrup in said machine.

4. A process in accordance with claim 1, wherein said alkali metal or alkaline earth metal thiosulfate is applied to a cup which is dispensed from a dispensing machine and the step of mixing said water with said flavor substance and said alkali metal or alkaline earth metal thiosulfate occurring when said soft drink syrup and said water are introduced into said cup in said dispensing machine.

* * * * *